A. H. BALDWIN.
FILTERING APPARATUS.
APPLICATION FILED JULY 22, 1914.
1,135,753.
Patented Apr. 13, 1915.
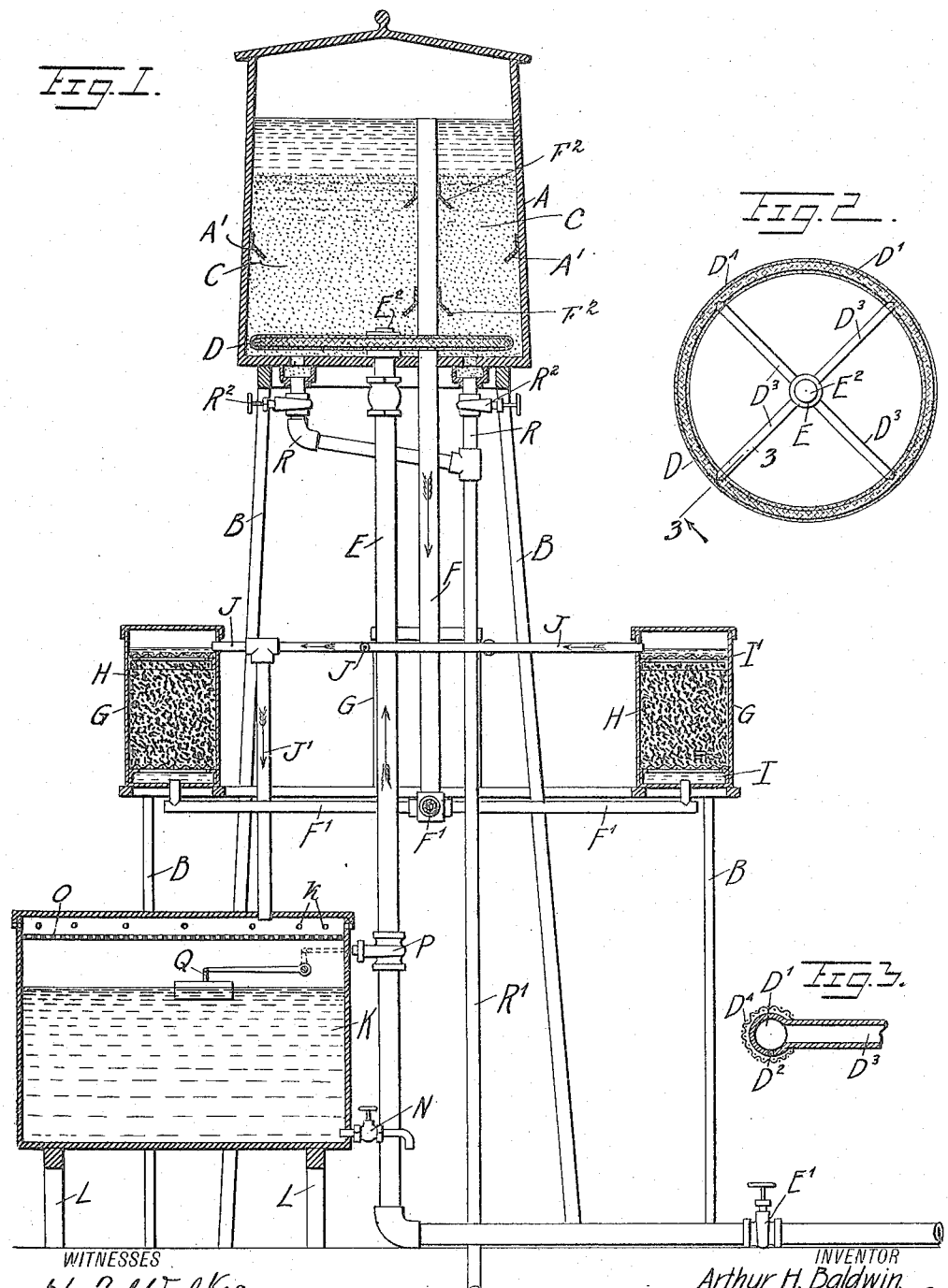
WITNESSES
H. I. Walker
Theo. G. Hoster
INVENTOR
Arthur H. Baldwin
BY Munn & Co.
ATTORNEYS

UNITED STATES PATENT OFFICE.

ARTHUR H. BALDWIN, OF NORWALK, CONNECTICUT.

FILTERING APPARATUS.

1,135,753.  Specification of Letters Patent.  Patented Apr. 13, 1915.

Application filed July 22, 1914. Serial No. 852,354.

*To all whom it may concern:*

Be it known that I, ARTHUR H. BALDWIN, a citizen of the United States, and a resident of Norwalk, in the county of Fairfield and State of Connecticut, have invented a new and Improved Filtering Apparatus, of which the following is a full, clear, and exact description.

The object of the invention is to provide a new and improved filtering apparatus, more especially designed for use by small communities for filtering and purifying the drinking water and arranged to insure a thorough and effective filtering and purifying of the water at a comparatively small expense and to permit convenient periodical cleaning of the system without interrupting the water supply.

In order to accomplish the desired result, use is made of an overhead receiving tank connected with a source of water supply, a series of purifying vessels arranged below the said receiving tank, an overflow pipe connected with the said receiving tank and discharging into the lower ends of the said vessels, a reservoir arranged below the said purifying vessels, and overflow pipes connected with the said purifying vessels and discharging into the said reservoir.

A practical embodiment of the invention is represented in the accompanying drawings forming a part of this specification, in which similar characters of reference indicate corresponding parts in all the views.

Figure 1 is a sectional side elevation of the filtering apparatus; Fig. 2 is a plan view of the water distributer in the receiving tank and connected with the supply pipe; and Fig. 3 is an enlarged sectional side elevation of the same on the line 3—3 of Fig. 2.

A receiving tank A is mounted on a suitable support B erected on the ground to support the tank A at a desired height above the ground. The receiving tank A is filled in its lower portion with sand, gravel or like loose filtering material C, and in the bottom portion of the said tank A is arranged a water distributer D connected with a supply pipe E leading from a suitable source of water supply. The pipe E is provided with a valve E' for controlling the supply of water to the overhead receiving tank A. The water distributer D is preferably in the form of a ring-shaped pipe D' provided at its bottom with perforations D² and connected by radial pipes D³ with the upper end of the supply pipe E, closed on top by a suitable plug E². The pipe D' is preferably covered with a covering D⁴ of an open mesh fabric of wire or other material, to distribute the water uniformly around the ring-shaped pipe D'. It is understood that the water passing up the supply pipe E flows from the latter by the pipes D³ into the ring-shaped pipe D' from which the water passes out by way of the perforations D² and the covering D⁴ into the bottom of the receiving tank A to rise therein and then pass through the sand C with a view to filter the incoming water.

An overflow pipe F extends with its upper end in the receiving tank A a distance above the filtering material C so as to draw off the filtered water from the top of the tank A, but the lower end of the overflow pipe F connects by branch pipes F' with the bottoms of purifying vessels G mounted on the support B a distance below the receiving tank A so that the water flows by gravity from the tank A by way of the overflow pipe F and branch pipes F' into the lower ends of the purifying vessels G to rise therein and pass through charcoal or other loose purifying material H held in the said vessels G. The purifying material H in each of the vessels G is held between bottom and top perforate disks I, I', of which the disk I is a distance above the bottom of the vessel G and the disk I' is a distance from the top of the vessel G. The upper ends of the purifying vessels G are provided with overflow pipes J leading to a discharge pipe J' extending downwardly and discharging the filtered and purified water into a reservoir K mounted on a suitable support L held on the ground to support the reservoir K a distance above the ground but below the purifying vessels G. The reservoir K is provided with a faucet or other valved draw-off means N for withdrawing the filtered and purified water from the reservoir K. In the upper portion of the reservoir K is arranged a perforate, horizontally extending partition O disposed intermediate the level of the water in the reservoir K and the discharge end of the pipe J' so that the water entering the reservoir K by way of the pipe J' falls onto the partition O to be minutely divided and to pass in small drops or jets into the lower portion of the tank K. It will be noticed that by dividing the incoming water in the manner described, it readily takes up air admitted to the reservoir K through openings $k$ to aerate the water.

In order to control the supply of filtered, purified and aerated water to the reservoir K, use is made of a valve P arranged in the supply pipe E and connected with a float Q arranged within the reservoir K so as to rise and fall with the water in the said reservoir. When the water rises in the reservoir K above a normal predetermined level then the float Q closes the valve P to shut off the supply of water to the overhead receiving tank A, and when the water in the reservoir K falls below the normal level then the float Q opens the valve P to allow the water to pass up the supply pipe E into the overhead receiving tank A. It is understood that the withdrawal means N may connect with pipes leading to houses to supply the same with fresh drinking water, and the said withdrawal means N may be in the form of a faucet to supply water carts or other distributing vessels with water for carrying the water to the houses of the community.

Most of the impure or extraneous matter contained in the water is taken up by the filtering material C in the lower portion of the tank A and this filtering material can be withdrawn periodically from the overhead tank A by way of the pipes R leading to the discharge pipe R'. The pipes R are provided with valves $R^2$ and when opened allow the lower strata of the sand and the extraneous matter taken up by the same to flow out through the pipes R into the pipe R' to a suitable place of discharge. Fresh sand corresponding in amount to the quantities discharged from the overhead receiving tank is now filled into the latter and this operation is repeated periodically. The purifying material in the vessels G can be removed from time to time and replaced by a clean material of the same descriptive properties.

The various cleaning operations can be carried on without interruption in the supply of pure drinking water as the reservoir K will hold sufficient water until the cleansing operations have been carried out.

In order to prevent the incoming water from flowing uninterruptedly up the inner surface of the tank A without passing through the sand, use is made of one or more annular deflectors A' attached to the inner surface of the tank as indicated in Fig. 1. The deflectors A' deflect the water inwardly so that it passes through the sand. Similar deflectors $F^2$ are arranged on the portion of the pipe F extending through the sand C.

Having thus described my invention, I claim as new and desire to secure by Letters Patent:

1. In a filtering apparatus, an overhead tank, a filtering material in the tank, a water supply pipe extending into the tank through the bottom at the center thereof, a ring-shaped distributing pipe having radial pipes connected with the supply pipe, said distributing pipe having openings in its under side and arranged a short distance above the bottom of the tank, an overflow pipe extending into the tank through the bottom thereof above the filtering material, and a discharge pipe leading from the bottom of the said tank.

2. In a filtering apparatus, an overhead tank, a filtering material in the tank, a water supply pipe extending into the tank, a water distributer connected with the supply pipe and arranged in the tank a short distance above the bottom thereof, said distributer being circular and having discharge openings in its under side, an overflow pipe extending through the bottom of the tank above the filtering material, and valved discharge pipes connected with the bottom of the tank.

3. In a filtering apparatus, a receiving tank containing a filtering material, a water supply pipe extending into the tank through the bottom thereof, and a water distributer in the form of a ring-shaped pipe having perforations in its under side and provided with radial pipes connected with the supply pipe, said distributer being arranged a short distance above the bottom of the tank.

4. In a filtering apparatus, a receiving tank containing a filtering material, a water supply pipe extending into the tank through the bottom thereof, and a water distributer arranged in the tank a short distance above the bottom of the tank, said distributer consisting of a ring-shaped pipe having openings in its under side, radial pipes connecting the ring-shaped pipe with the supply pipe, and a covering of open mesh fabric for the ring-shaped pipe.

In testimony whereof I have signed my name to this specification in the presence of two subscribing witnesses.

ARTHUR H. BALDWIN.

Witnesses:
ELBERT S. ADAMS,
THOMAS C. BALCOM.

Copies of this patent may be obtained for five cents each, by addressing the "Commissioner of Patents, Washington, D. C."